US008839256B2

(12) United States Patent
Achilles et al.

(10) Patent No.: US 8,839,256 B2
(45) Date of Patent: Sep. 16, 2014

(54) UTILIZATION OF SPECIAL PURPOSE ACCELERATORS USING GENERAL PURPOSE PROCESSORS

(75) Inventors: Heather D. Achilles, Hudson, NH (US); Giora Biran, Zichron-Yaakov (IL); Amit Golander, Tel-Aviv (IL); Nancy A. Greco, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 12/797,201

(22) Filed: Jun. 9, 2010

(65) Prior Publication Data
US 2011/0307890 A1    Dec. 15, 2011

(51) Int. Cl.
G06F 9/46      (2006.01)
G06F 15/00    (2006.01)
G06F 15/76    (2006.01)
G06F 9/50      (2006.01)

(52) U.S. Cl.
CPC ..................... G06F 9/505 (2013.01)
USPC ........... 718/102; 718/100; 718/103; 718/104; 718/105; 712/34

(58) Field of Classification Search
USPC ................... 718/100, 102, 104, 105; 712/34; 345/503
See application file for complete search history.

(56) References Cited

U.S. PATENT DOCUMENTS

| | | | |
|---|---|---|---|
| 5,940,086 A * | 8/1999 | Rentschler et al. | 345/503 |
| 6,151,034 A | 11/2000 | Jain et al. | |
| 7,302,462 B2 | 11/2007 | Kulp et al. | |
| 7,415,595 B2 | 8/2008 | Tell et al. | |
| 7,430,652 B2 * | 9/2008 | Hundley | 712/34 |
| 7,624,405 B1 * | 11/2009 | Legg et al. | 719/331 |
| 7,895,071 B2 * | 2/2011 | Khosla et al. | 705/7.12 |
| 8,005,978 B1 * | 8/2011 | Duffie et al. | 709/235 |
| 2003/0149716 A1 * | 8/2003 | Peterson | 709/101 |
| 2003/0231591 A1 * | 12/2003 | Andonov et al. | 370/231 |
| 2004/0257370 A1 * | 12/2004 | Lippincott et al. | 345/502 |
| 2006/0053424 A1 * | 3/2006 | Koistinen et al. | 718/105 |
| 2007/0283349 A1 * | 12/2007 | Creamer et al. | 718/100 |
| 2008/0079735 A1 | 4/2008 | Selwan et al. | |
| 2009/0064139 A1 * | 3/2009 | Arimilli et al. | 718/100 |
| 2009/0070553 A1 * | 3/2009 | Wallach et al. | 712/34 |
| 2009/0182978 A1 * | 7/2009 | Pierce et al. | 712/30 |
| 2009/0271141 A1 * | 10/2009 | Coskun et al. | 702/132 |
| 2011/0010721 A1 * | 1/2011 | Gupta et al. | 718/103 |

OTHER PUBLICATIONS

Anil Krishna, "A Proposal for Efficient CPU-Accelerator Handshake", IBM Corporation, Research Triangle Park, North Carolina, USA, 2009, http://research.ihost.com/waha2009/finalPapers/Ramani%20waha%20paper%2001.pdf.

(Continued)

*Primary Examiner* — Charles Swift
(74) *Attorney, Agent, or Firm* — Grant A. Johnson

(57) ABSTRACT

A novel and useful system and method of improving the utilization of a special purpose accelerator in a system incorporating a general purpose processor. In some embodiments, the current queue status of the special purpose accelerator is periodically monitored using a background monitoring process/thread and the current queue status is stored in a shared memory. A shim redirection layer added a priori to a library function task determines at runtime and in user space whether to execute the library function task on the special purpose accelerator or the general purpose processor. At runtime, using the shim redirection layer and based on the current queue status, it is determined whether to execute the library function task on the special purpose accelerator or on the general purpose processor.

23 Claims, 6 Drawing Sheets

(56) References Cited

OTHER PUBLICATIONS

Giora Biran, "Stateful Hardware Decompression in Networking Environment", ANCS '08 Nov. 6-7, 2008, San Jose, CA, USA p. 141-150.

"The 2009 workshop (WAHA) on accelerators under ICS"23rd International Conference on Supercomputing Jun. 8-12, 2009, IBM T.J. Watson Research Center, Yorktown Heights, NY, USA, http://www.ics-conference.org/archive/ics09/workshops.html#3.

http://www.zlib.net/manual.net, "zlib 1.2.4 Manual", pp. 1-38, printed Apr. 8, 2010.

* cited by examiner

UTILIZATION OF SPECIAL PURPOSE ACCELERATORS USING GENERAL PURPOSE PROCESSORS

FIELD OF THE INVENTION

The present invention generally relates to the field of digital data and signal processing, and more particularly relates to a system and method for improving the utilization of special purpose accelerators using general purpose processors in an application transparent manner and without the use of system calls.

SUMMARY

One embodiment of the present invention is a novel and useful system and method of improving the utilization of a special purpose accelerator in a system incorporating a general purpose processor. In some embodiments, the current queue status of the special purpose accelerator is periodically monitored using a background monitoring process/thread and the current queue status is stored in a shared memory. A shim redirection layer added a priori to a library function task determines at runtime and in user space whether to execute the library function task on the special purpose accelerator or the general purpose processor. At runtime, using the shim redirection layer and based on the current queue status, it is determined whether to execute the library function task on the special purpose accelerator or on the general purpose processor.

One embodiment of the invention is a method of improving the utilization of a special purpose accelerator in a system incorporating a general purpose processor, the method comprising periodically monitoring the queue status of the special purpose accelerator and storing the queue status in a shared memory, and determining whether to execute a task on the special purpose accelerator or on the general purpose processor as a function of the queue status read from the shared memory.

Another embodiment of the invention is a method of improving the utilization of a special purpose accelerator in a system incorporating a general purpose processor, the method comprising periodically monitoring the current queue status of the special purpose accelerator and storing the current queue status in a shared memory, providing a shim redirection layer added to a library function task for determining at runtime and in user space whether to execute the library function task on the special purpose accelerator or the general purpose processor, and determining at runtime, using the shim redirection layer, whether to execute the library function task on the special purpose accelerator or on the general purpose processor as a function of the current queue status.

Another embodiment of the invention is a system for improving the utilization of a special purpose accelerator in a system incorporating a general purpose processor, comprising a shared memory accessible to the special purpose accelerator and the general purpose processor, a background monitor process running in management space and operative to periodically monitor the current queue status of the special purpose accelerator and store the current queue status in the shared memory, and a shim redirection layer added to a library function task for determining at runtime and in user space whether to execute the library function task on the special purpose accelerator or the general purpose processor based on the current queue status read from the shared memory.

Another embodiment of the invention is a computer program product for improving the utilization of a special purpose accelerator in a system incorporating a general purpose processor, the computer program product comprising a computer usable medium having computer usable code embodied therewith, the computer usable program code comprising computer usable code configured for periodically monitoring the current queue status of the special purpose accelerator and storing the current queue status in a shared memory, computer usable code configured for providing a shim redirection layer added to a library function task for determining at runtime and in user space whether to execute the library function task on the special purpose accelerator or the general purpose processor, and computer usable code configured for determining at runtime whether to execute the library function task on the special purpose accelerator or on the general purpose processor as a function of the current queue status read from the shared memory.

BRIEF DESCRIPTION OF THE DRAWINGS

The invention is herein described, by way of example only, with reference to the accompanying drawings, wherein.

DETAILED DESCRIPTION

Figure 1:
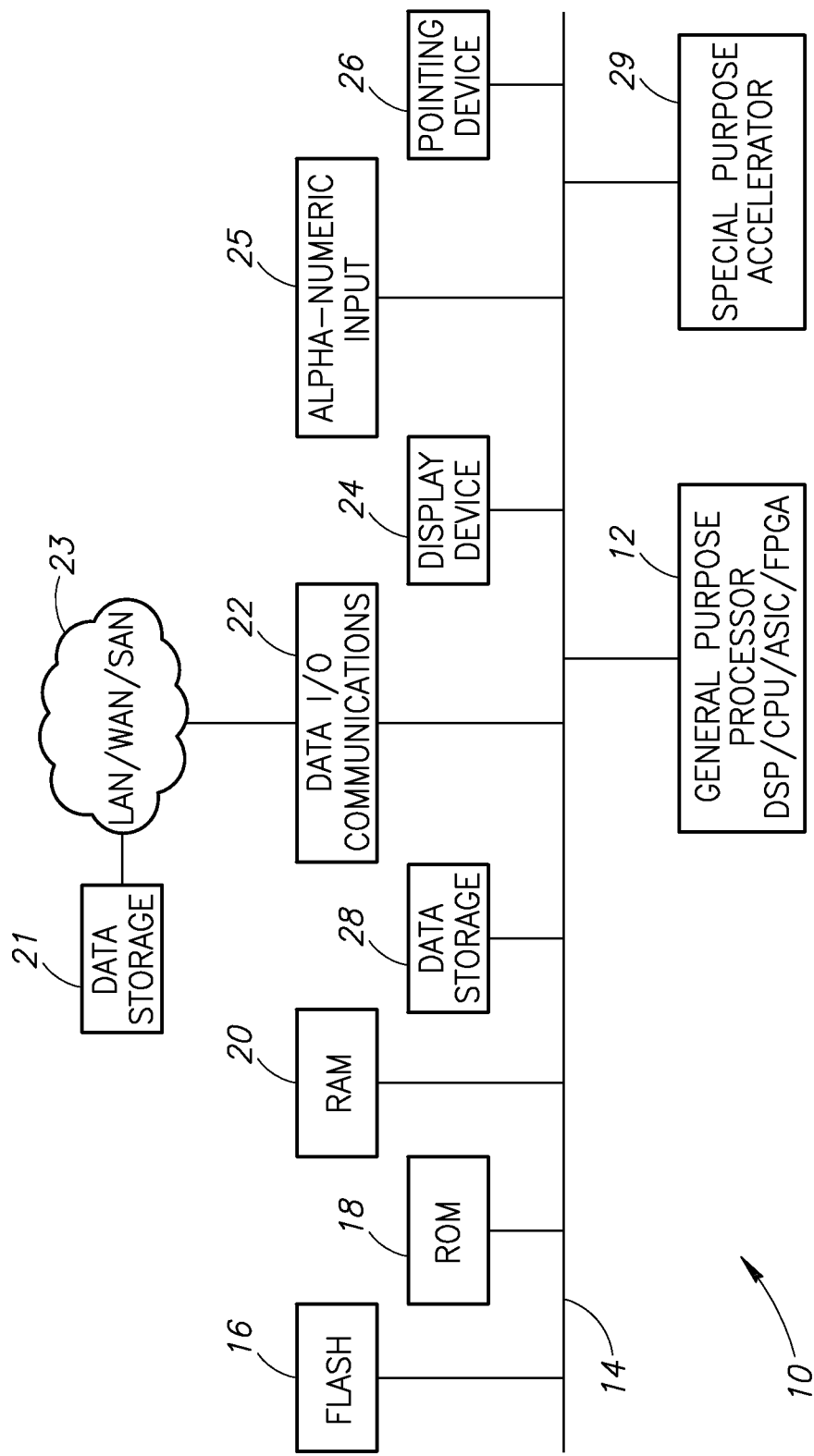
FIG. 1 is a block diagram illustrating an example computer processing system adapted to implement the accelerator utilization improvement mechanism of the present invention.

The present invention is a novel and useful system and method of improving the utilization of a special purpose accelerator in a system incorporating a general purpose processor. In some embodiments, the current queue status of the special purpose accelerator is periodically monitored using a background monitoring process/thread and the current queue status is stored in a shared memory. A shim redirection layer added a priori to a library function task determines at runtime and in user space whether to execute the library function task on the special purpose accelerator or the general purpose processor. At runtime, using the shim redirection layer and based on the current queue status, it is determined whether to execute the library function task on the special purpose accelerator or on the general purpose processor.

Some advantages of using special purpose accelerators on their own are the improved throughput, latency and power efficiency that is achieved. Several advantages of the accelerator utilization improvement mechanism that attempt to blend hardware acceleration with general purpose processing (i.e. software) include: (1) use of the mechanism does not require a change to the application code; (2) the mechanism executes in the user space portion of the operating system; and (3) the mechanism has relatively low overhead at runtime.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Moreover, some aspects of the present invention are particularly suitable of being distributed as a set of instructions for a fabrication facility ("fab") encoded onto the medium (e.g., as a Release Interface Tape or "RIT," a "tape-out," a "GDS2," etc).

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: (i) an electrical connection having one or more wires; (ii) a non-transitory computer readable media, including without limitation, a portable computer diskette, a hard disk, a random access memory (RAM), a read-only memory (ROM), an erasable programmable read-only memory (EPROM or Flash memory), a portable compact disc read-only memory (CDROM), an optical storage device, and a magnetic storage device; (iii) an optical fiber; and (iv) a transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Moreover, embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may further include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the system and methods of the present invention is shown in FIG. 1. The computer system, generally referenced 10, comprises a general purpose processor 12 which may comprise a digital signal processor (DSP), central processing unit (CPU), microcontroller, microprocessor, microcomputer, ASIC or FPGA core as well as a special purpose accelerator 29. The system also comprises static read only memory 18 and dynamic main memory (e.g., RAM) 20 all in communication with the processor. The general purpose processor 12 as well as the special purpose accelerator 29 is in communication with bus 14. A number of peripheral devices that are also included in the computer system are also coupled to bus and include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network adapters or network interface card (NIC)). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 21 and/or 28 for storing application programs and data. The system comprises computer readable storage medium that may include any suitable memory means, including but not limited to, magnetic storage, optical storage, semiconductor volatile or non-volatile memory or any other memory storage device.

Software adapted to implement the system and methods of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Accelerator Utilization Improvement Mechanism

Special-purpose accelerators are well-known devices used to provide an efficient method of offloading computationally intensive tasks from the general-purpose processor (e.g., CPU or microprocessor). It can be used in many different systems such as embedded systems, mobile phones, personal computers, workstations, and game consoles. For example, modern graphics processing units (GPUs) are very efficient at manipulating computer graphics, and their highly parallel structure makes them more effective than general-purpose CPUs for a range of complex algorithms. In a personal computer, a GPU can be present on a video card, or it can be on the motherboard. More than 90% of new desktop and notebook computers have integrated GPUs, which are usually far less powerful than those on a dedicated video card.

Accelerators are emerging in high-performance computer architectures, one example being a decompression accelerator. In a popular methodology, general purpose processors can post asynchronous requests to queues that are served by accelerators. Such posts can be performed from user space without the performance degradation caused by context switching to the kernel. Implementing the accelerator requests within functional libraries, such as zlib, is a common practice that helps minimize the need to change the applications source code. Note that zlib is a software library used for data compression, currently maintained at http://www.zlib.net/. More information about zlib can be find in the zlib Manual, which is herein incorporated by reference in its entirety.

Sending asynchronous requests to special-purpose accelerators, however, has several disadvantages including: (1) the special-purpose accelerator may become the system bottleneck; (2) the special-purpose accelerator may increase task latency; and (3) the special-purpose accelerator may degrade overall task quality (e.g., the compression ratio achieved can vary between implementations).

To address these issues, some embodiments of the invention provide a system and method of improving the utilization of a special purpose accelerator in a system incorporating a general purpose processor. The accelerator utilization improvement mechanism improves the throughput, latency and quality of special-purpose tasks in the system. This is achieved both in an application independent manner and in user space.

The accelerator utilization improvement mechanism acknowledges that system performance for pre-defined tasks is not solely dependant on the special purpose hardware accelerators. The special purpose accelerators set the base which can be improved via appropriate software management. In order to achieve this in an efficient manner (i.e. without requiring any system calls and no application-level awareness), the mechanism provides two new components: (1) a background monitoring process/thread for monitoring the status of the special purpose accelerator (i.e. queue status, etc.); and (2) a shim redirection layer at the head of the library function operative to determine whether to send a task to the special purpose accelerator (i.e. hardware execution) or the general purpose processor (i.e. software execution).

The advantage provided by the accelerator utilization improvement mechanism over using accelerators on their own is in throughput, latency and quality. The advantage over other methods that blend hardware acceleration with software is that the accelerator utilization improvement mechanism: (1) does not change the task application code; and (2) runs in user space.

Figure 2:
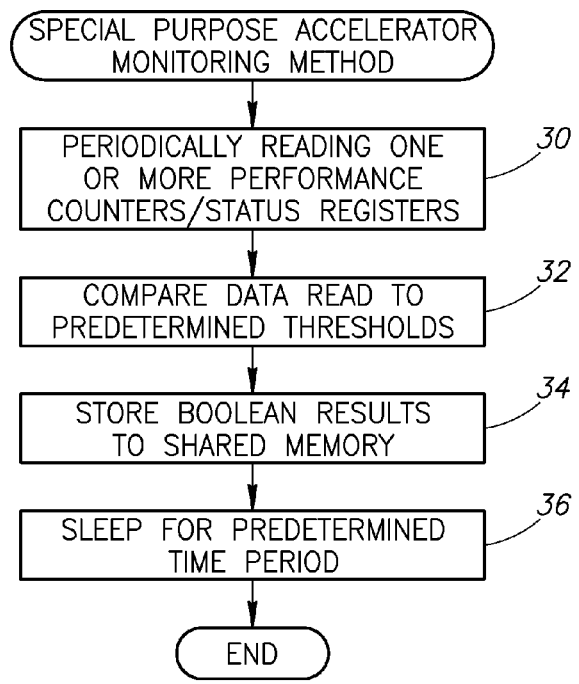
FIG. 2 is a flow diagram illustrating an example special purpose accelerator monitoring method.

A flow diagram illustrating an example special purpose accelerator monitoring method is shown in FIG. 2. A background monitoring process is operative to generate and update semi-static Boolean variables which are required for use by the shim redirection layer.

An example pseudo-code listing for the background monitoring process is provided below in Listing 1:

Listing 1: Background monitoring process

For each accelerator;
{
    Periodically read relevant performance counters (step 30);
    Compare them to predefined thresholds and generate one or more
    Boolean results (step 32);
    Store the resulting Boolean results to a shared memory (or page)
    where all processes have at least read permission (step 34);
}
Sleep for 1 ms (or other suitable time period) (step 36);

Note that the performance counters may comprise any appropriate measure of the status of the special purpose accelerator. Examples include, but at not limited to, the length of the queue, average work load for each accelerator, the time to reach the one half queue point, average service time for data in the queue, number of pending requests in the queue, the frequency of arrival of new accelerator requests, whether the queue is overloaded or not, etc. The threshold comprises any suitable comparison criterion or criteria, such as for example, a percent full value for the queue, a particular number of pending requests in the queue, time to service requests in the queue.

The mechanism generates one or more Boolean values (i.e. true/false values) as a result of the comparison of the current queue status to the one or more thresholds. Boolean examples include "overutilized" or not, system is busy or idle, etc. The resulting Boolean results are stored in shared memory for access by the shim redirection layer.

Figure 3:
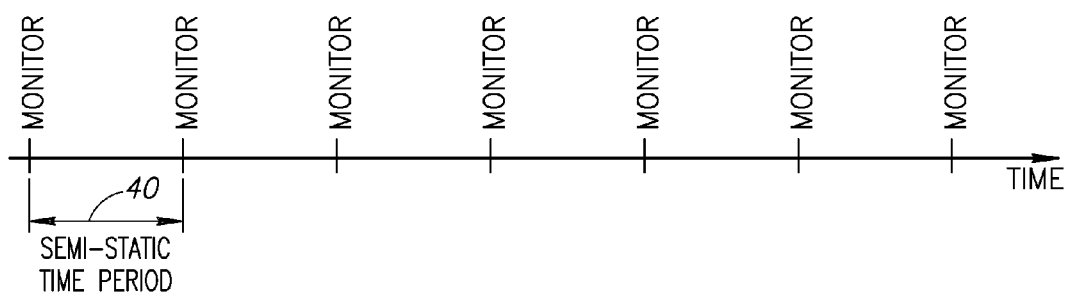
FIG. 3 is a diagram illustrating example periodic monitoring time periods of the special purpose accelerator monitoring method.

A diagram illustrating example periodic monitoring time periods of the special purpose accelerator monitoring method is shown in FIG. 3. The periodic execution of the background monitoring process (task) is shown whereby the sleep period 40 between the execution of two consecutive monitoring periods is a semi-static time period. In the example embodiment presented herein, the sleep period is 1 ms. It is appreciated that the sleep period may be configured to be any desirable time period depending on the particular implementation.

Note that the background monitoring task is operative to execute in kernel (i.e. management) space to permit access to the special purpose accelerator related status data (e.g., performance counters, etc.). The shared memory in which the Boolean results are stored, however, is accessible by all processes. This avoids the necessity of each library function or other task running in user space to get permission to access kernel space to check the status (e.g., performance counters) of the special purpose accelerator.

Figure 4:
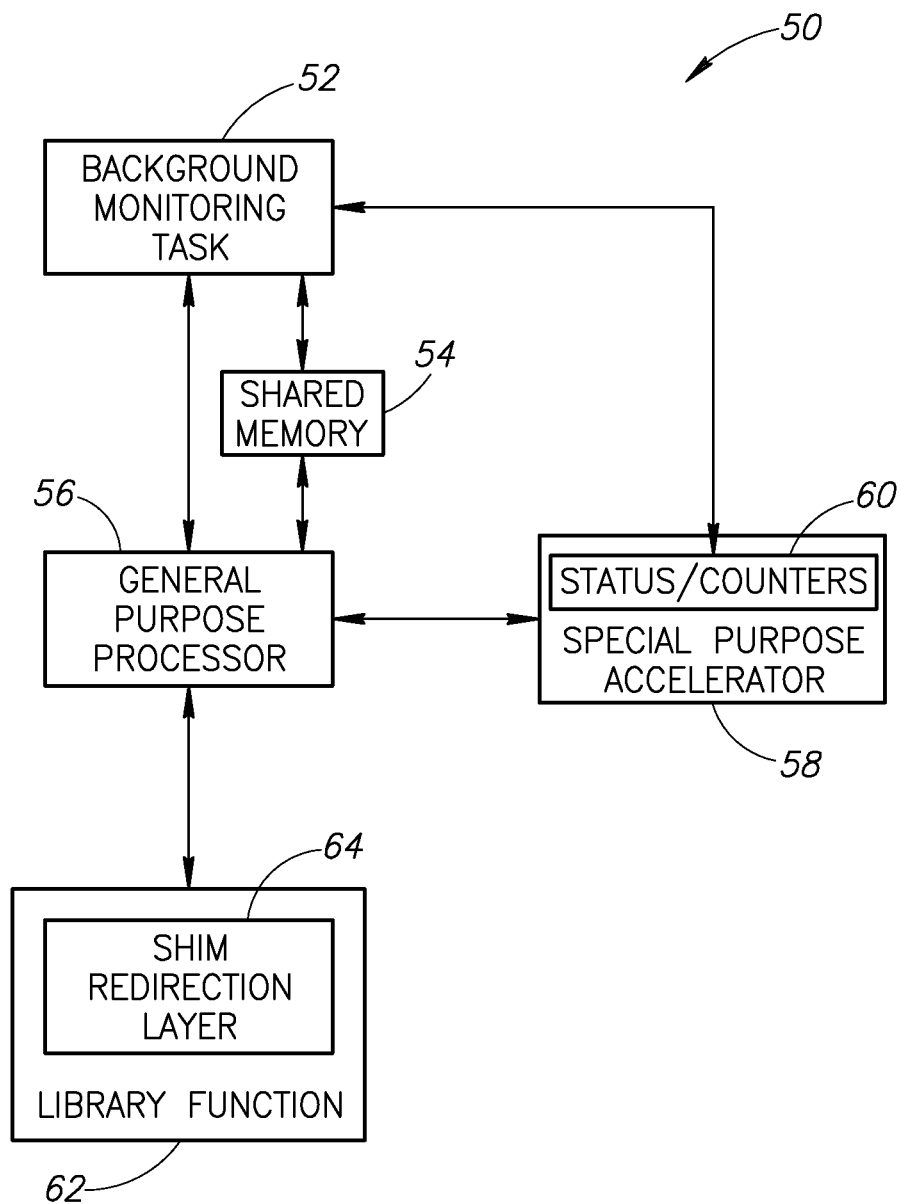
FIG. 4 is a block diagram illustrating an example system incorporating the accelerator utilization improvement mechanism.

A block diagram illustrating an example system incorporating the accelerator utilization improvement mechanism is shown in FIG. 4. The system, generally referenced 50, comprises a general purpose processor 56 in communication with special purpose accelerator 58 comprising one or more status/performance counters 60, background monitoring task 52, shared memory 54 and library function call(s) 62 comprising shim redirection layer code 64.

In operation, the background monitoring task 52 (running in kernel space) periodically measures the status of the special purpose accelerator 58. One or more Boolean values are written to the shared memory 54. During runtime, the shim redirection layer 64 in the library function 62 reads the Boolean values in the shared memory in making a determination of whether to run the library call task on the general purpose processor (i.e. in software) or on the special purpose accelerator (i.e. in hardware).

Figure 5:
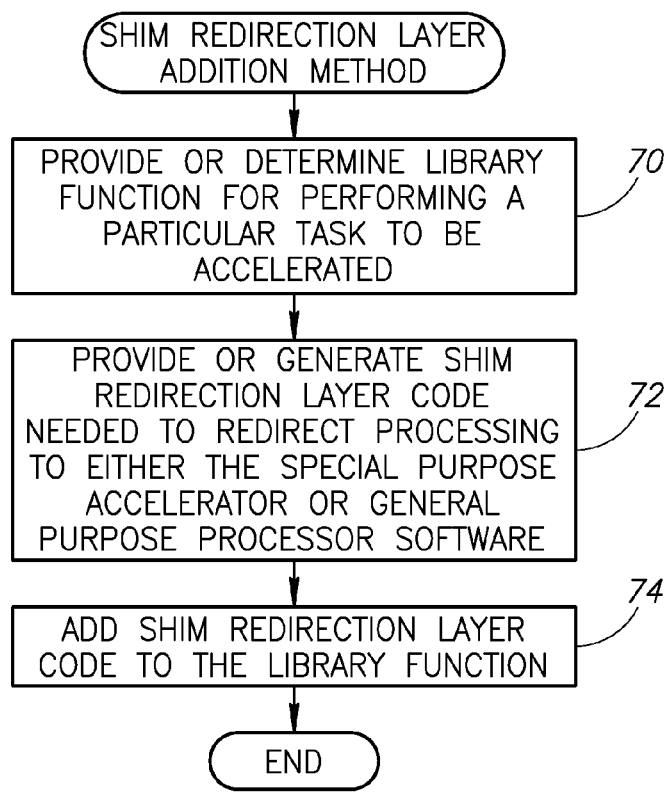
FIG. 5 is a flow diagram illustrating the flow redirection layer addition method of the accelerator utilization improvement mechanism in more detail.

A flow diagram illustrating the flow redirection layer addition method of the accelerator utilization improvement mechanism in more detail is shown in FIG. 5. Initially, the particular library function for performing a particular task that is be accelerated is determined or provided (step 70). Shim redirection layer code is provided or generated that is needed to redirect processing to either the special purpose accelerator or general purpose processor software (step 72). The shim redirection layer code is added to the actual library function (step 74). Note that this step is performed a priori before the library function is called. Note that in one example embodiment, the shim redirection layer comprises a plurality of 'if' statements that are added to the library function. The 'if' statements effectively implement the decision of whether to redirect the task execution to hardware (i.e. the special purpose accelerator) or software (i.e. the general purpose processor).

Figure 6:
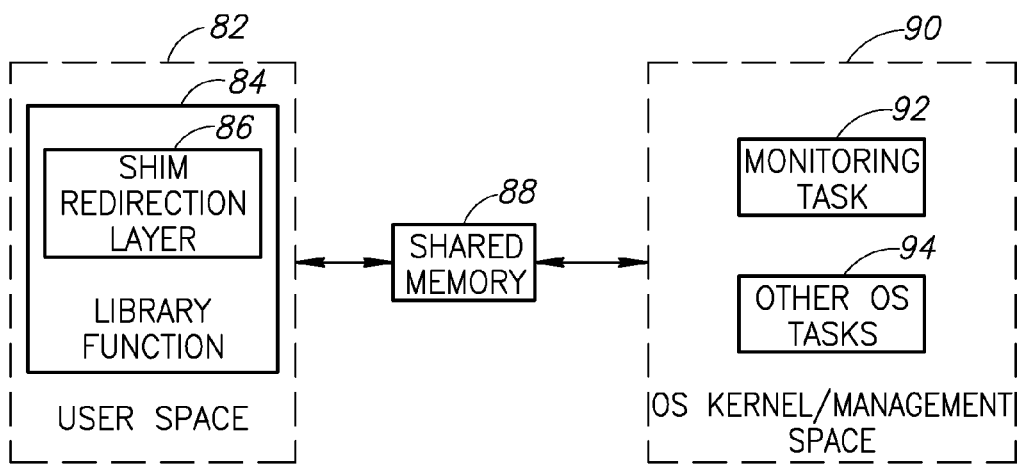
FIG. 6 is a diagram illustrating the execution of the shim redirection layer in user space and the monitoring task in management space.

A diagram illustrating the execution of the shim redirection layer in user space and the monitoring task in management space is shown in FIG. 6. The system, generally referenced 80, comprises a background monitoring task 92, along with other tasks 94 (operating system related or otherwise) running in OS kernel/management space 90, a library function 84 comprising shim redirection layer code 86 running in user space 82. The monitoring task and shim redirection layer communicate via shared memory 88.

Figure 7:
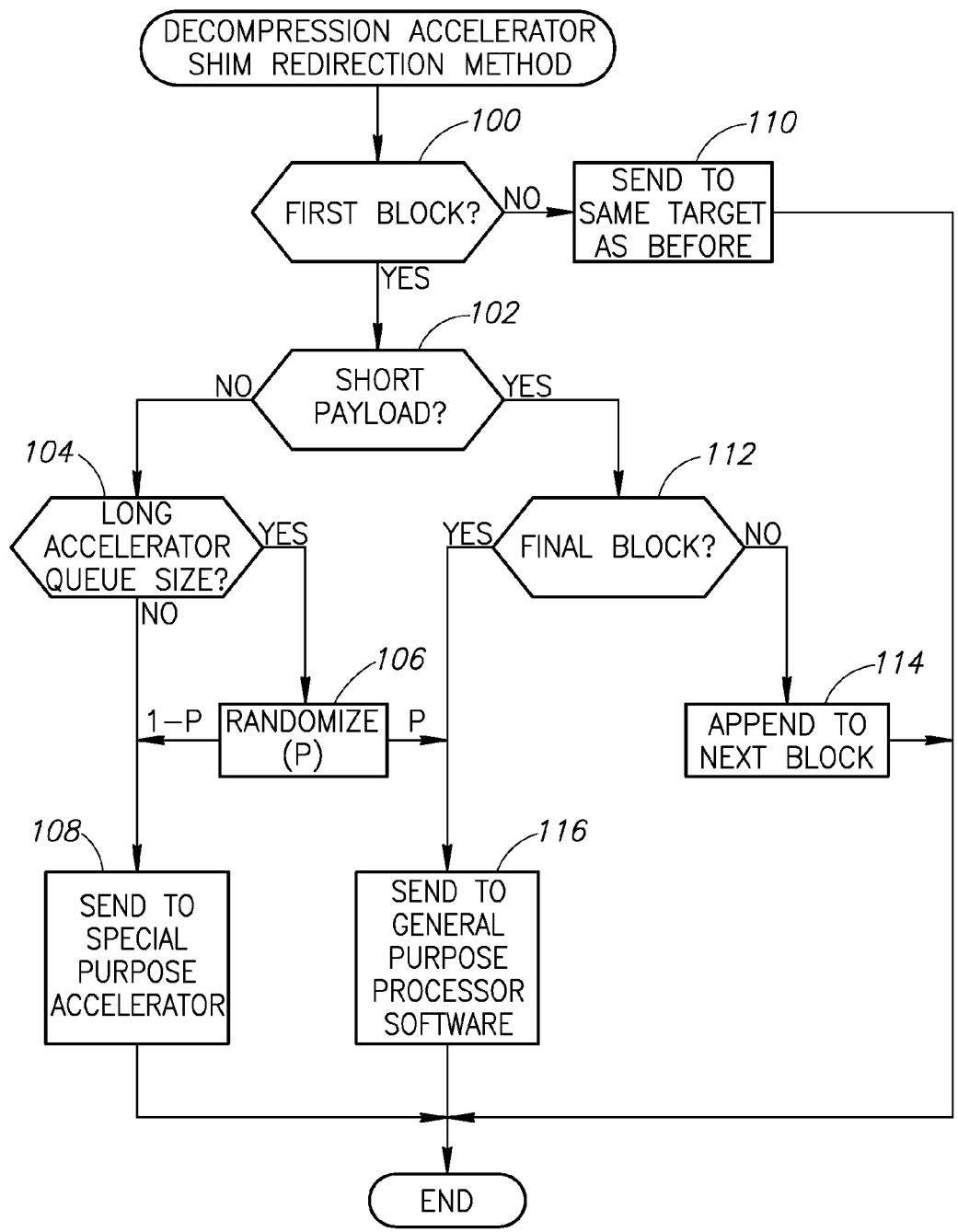
FIG. 7 is a flow diagram illustrating an example decompression accelerator shim redirection method.

A flow diagram illustrating a first example decompression accelerator shim redirection method is shown in FIG. 7. In this example embodiment, a decompression accelerator is used to speed up a decompression process. Use of the mechanism with the decompression accelerator (1) serves to improve throughput and latency; (2) provides a single legal output thus eliminating any quality considerations; (3) and supports continuous mode (CM) so that a file can be sent to be decompressed in chunks.

If the input block of data being considered is not the first block (step 100), then it is sent to the same target as done previously (step 110). Thus non first block data chunks are either sent to the special purpose accelerator or the general purpose processor. If the input data is the first chunk (step 100), it is checked if the input data block is a short payload (step 102). If it is a short block, but it is not a final block (step 112), the input data block is appended to the next data block (step 114). If it is a final block, it is sent to the general purpose processor software (step 116).

If the input data block is not a short block (step 102), the accelerator queue status is checked (step 104). If the queue size is long, then the input data block is assigned to either the special purpose accelerator or the general purpose processor in accordance with the random function (step 106). Thus, the current data block is sent to the general purpose processor (step 116) with a probability of 'p' while the input data block is sent to the special purpose accelerator (step 108) with a probability of '1−p'. The input data block is also sent to the special purpose accelerator (step 108) if the accelerator queue size is not long (step 104).

Figure 8:
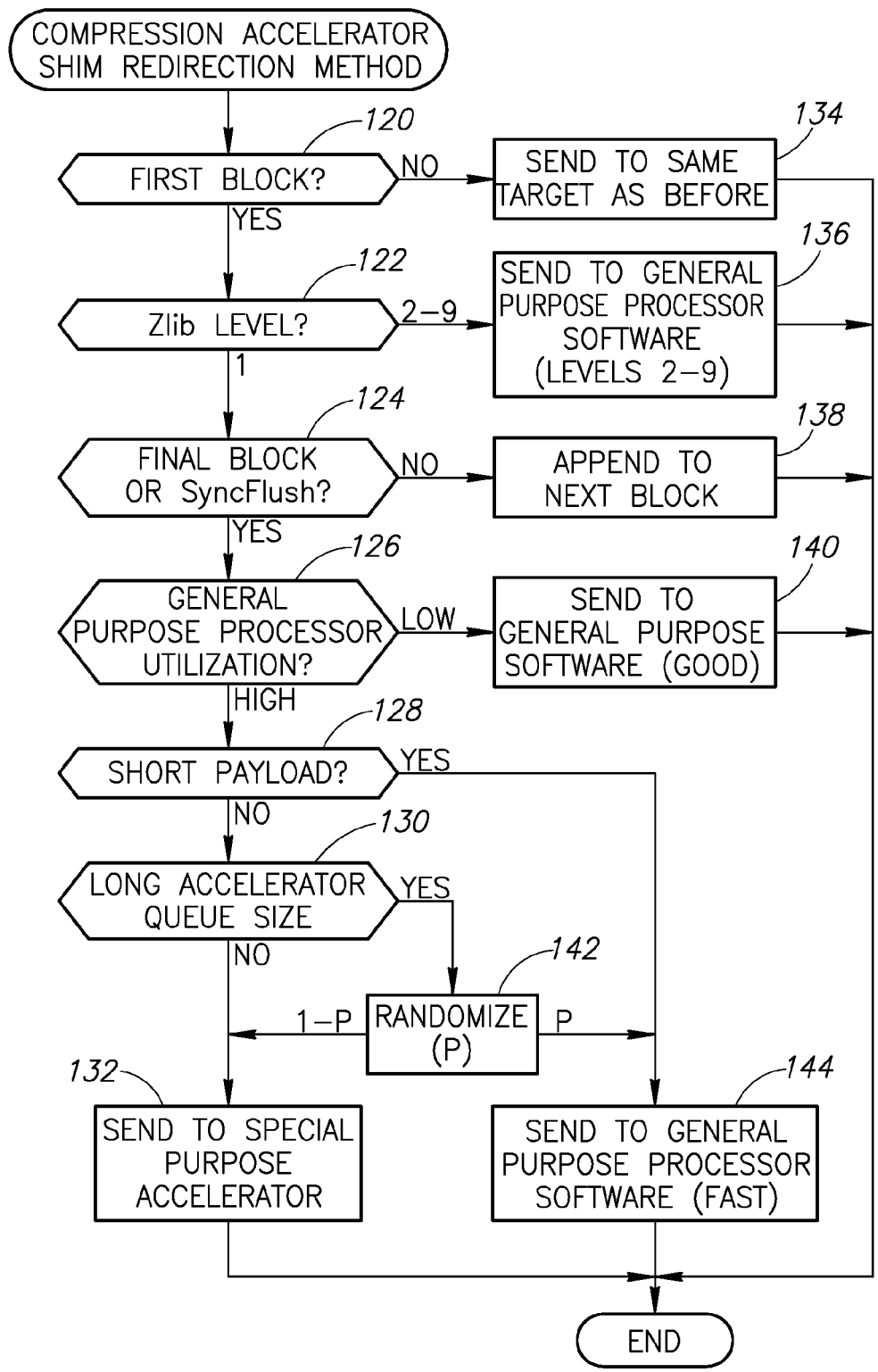
FIG. 8 is a flow diagram illustrating an example compression accelerator shim redirection method.

A flow diagram illustrating a second example compression accelerator shim redirection method is shown in FIG. 8. First, it is checked whether the input block is a first block (step 120). If it is not the first, it is sent to the same target as the previous data block (step 134). If the input data block is the first block (step 120), then it is checked what level compression is desired (e.g., the zlib call level can provide this information) (step 122). Levels 2 to 9 (or another dividing point) are sent to the general purpose processor (step 136).

Level 1 continues whereby it is checked whether the input block is a final block or SyncFlush (step 124). If not, the input block is appended to the next block (step 138). If so, the status of the general purpose processor utilization is checked (step 126). Note that SyncFlush refers to a field name from the Zlib API. Since it is essentially a sync request, data accumulated thus far must be processed and sent out.

If general purpose processor utilization is low, the input block is sent to the general purpose processor for execution (step 140). If general purpose processor utilization is high (step 126), it is then checked whether the input block is a short payload (step 128). If so, the input block is processed in software on the general purpose processor (step 144). Note that in this case, the Zlib software would just run on the same process/hardware as without the benefit of the mechanism.

If the input block is not a short payload (step 128), the accelerator queue size is then checked (step 130). If the queue size of the special purpose accelerator is long, a randomized function (step 142) is used to decide whether to send the input block to either the special purpose accelerator or the general purpose processor. Thus, the current data block is sent to the general purpose processor (step 144) with a probability of 'p' while the input data block is sent to the special purpose accelerator (step 132) with a probability of '1−p'. The input data block is also sent to the special purpose accelerator (step 132) if the accelerator queue size is not long (step 130).

Note that in one embodiment, short blocks of data are accumulated for processing in order to avoid the overhead associated with activation of the special purpose accelerator for a short data block. In addition, to further improve compression quality, higher compression levels are executed on the general purpose processor when it is detected that a sufficient number of internal processor cores are idle.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of improving the utilization of a special purpose accelerator in a system incorporating a general purpose processor, said method comprising:
    periodically monitoring, via a monitoring task executing in kernel space, one or more performance counters of said special purpose accelerator, comparing said one or more performance counters to predetermined thresholds to generate respective Boolean results and storing said results in a shared memory accessible by all processes;
    determining whether to execute a task on said special purpose accelerator or said general purpose processor as a function of said results read from said shared memory; and
    wherein for long accelerator queues, assigning said task to either said special purpose accelerator or said general purpose processor in accordance with a random function and the value of said Boolean results, resulting in tasks being assigned to said general purpose processor or special purpose accelerator with a probability 'p', wherein the probability p is associated randomization of assigning tasks as employed by the random function.

2. The method according to claim 1, wherein said determination is made by a shim redirection layer added to a library function a priori, wherein said shim redirection layer code communicated with said monitoring task via said shared memory.

3. The method according to claim 1, wherein said determination is made at run time and in user space.

4. The method according to claim 1, wherein said monitoring of said queue status is performed in management space.

5. The method according to claim 1, wherein said task is more likely to run on said special purpose accelerator if said special purpose accelerator is underutilized.

6. The method according to claim 1, wherein determining whether to execute a task on said special purpose accelerator comprises:
    determining whether to execute said task on said general purpose processor, wherein said task is more likely to run on said general purpose processor if said special purpose accelerator is overutilized.

7. The method according to claim 1, wherein said results comprise one or more Boolean values generated by comparing one or more performance counters and status registers of said special purpose accelerator to corresponding thresholds.

8. The method according to claim 1, further comprising accumulating short blocks of data for processing in order to avoid overhead associated with activation of said special purpose accelerator for a short data block.

9. The method according to claim 1, further comprising executing higher compression levels on said general purpose processor when internal processor cores are idle, thereby improving compression quality.

10. A method of improving the utilization of a special purpose accelerator in a system incorporating a general purpose processor, said method comprising:

periodically monitoring, via a monitoring task executing in kernel space, one or more performance counters of said special purpose accelerator, comparing said one or more performance counters to predetermined thresholds to generate respective Boolean results and storing said results in a shared memory accessible by all processes;

providing a shim redirection layer added to a library function task a priori before said library function is called, said shim redirection layer containing code including one or more 'if' statements for determining at runtime and in user space whether to execute said library function task on said special purpose accelerator or said general purpose processor, said shim redirection layer code communicating with said monitoring task via said shared memory;

determining at runtime, using said shim redirection layer, whether to execute said library function task on said special purpose accelerator or on said general purpose processor as a function of said results and the status of said one or more performance counters; and wherein for long accelerator queues, assigning said task to either said special purpose accelerator or said general purpose processor in accordance with a random function and the value of said Boolean results, resulting in tasks being assigned to said general purpose processor or special purpose accelerator with a probability 'p', wherein the probability p is associated randomization of assigning tasks as employed by the random function.

11. The method according to claim 10, wherein said shim redirection layer is added to said library function task a priori.

12. The method according to claim 10, wherein said monitoring of the current queue status is performed in management space.

13. The method according to claim 10, wherein said library function task is more likely to run on said special purpose accelerator if said special purpose accelerator is underutilized.

14. The method according to claim 10, wherein said library function task is more likely to run on said general purpose processor if said special purpose accelerator is overutilized.

15. The method according to claim 10, wherein said results comprise one or more Boolean values generated by comparing one or more performance counters and status registers of said special purpose accelerator to corresponding thresholds.

16. The method according to claim 10, further comprising accumulating short blocks of data for processing in order to avoid overhead associated with activation of said special purpose accelerator for a short data block.

17. The method according to claim 10, further comprising executing higher compression levels on said general purpose processor when internal processor cores are idle, thereby improving compression quality.

18. A system for improving the utilization of a special purpose accelerator in a system incorporating a general purpose processor, comprising:

a shared memory accessible to all processes including said special purpose accelerator and said general purpose processor;

a background monitor process running in kernel/management space and operative to periodically monitor one or more performance counters of said special purpose accelerator, compare said one or more performance counters to predetermined thresholds to generate respective Boolean results and to store said results in said shared memory;

a shim redirection layer added to a library function task a priori before said library function is called, said shim redirection layer containing code including one or more if statements for determining at runtime and in user space whether to execute said library function task on said special purpose accelerator or said general purpose processor based on said results read from said shared memory: said shim redirection layer code communicating with said monitoring task via said shared memory; and wherein for long accelerator queues, assigning said task to either said special purpose accelerator or said general purpose processor in accordance with a random function and the value of said Boolean results, resulting in tasks being assigned to said general purpose processor or special purpose accelerator with a probability 'p', wherein the probability p is associated randomization of assigning tasks as employed by the random function.

19. The system according to claim 18, wherein said shim redirection layer is added to said library function a priori.

20. The system according to claim 18, wherein said task is more likely to run on said special purpose accelerator if said special purpose accelerator is underutilized.

21. The system according to claim 18, wherein said task is more likely to run on said general purpose processor if said special purpose accelerator is overutilized.

22. The system according to claim 18, wherein said results comprise one or more Boolean values generated by comparing one or more performance counters and status registers of said special purpose accelerator to corresponding thresholds.

23. A computer program product for improving the utilization of a special purpose accelerator in a system incorporating a general purpose processor, the computer program product comprising:

a tangible, non-transitory computer usable medium having computer usable code embodied therewith, the computer usable code comprising:

first computer usable code configured for periodically monitoring, via a monitoring task executing in kernel space, one or more performance counters of said special purpose accelerator, comparing said one or more performance counters to predetermined thresholds to generate respective Boolean results and storing said results in a shared memory accessible by all processes;

second computer usable code configured for providing a shim redirection layer added to a library function task a priori before said library function is called, said shim redirection layer containing code including one or more if statements for determining at runtime and in user space whether to execute said library function task on said special purpose accelerator or said general purpose processor, said shim redirection layer code communicating with said monitoring task via said shared memory;

third computer usable code configured for determining at runtime whether to execute said library function task on said special purpose accelerator or on said general purpose processor as a function of said results read from said shared memory, and the status of said one or more performance counters; and fourth computer usable code configured for assigning said task to either said special purpose accelerator or said general purpose processor in accordance with a random function and the value of said Boolean results, resulting in tasks being assigned to said general purpose processor or special purpose accelerator with a probability 'p', wherein the probability p is associated randomization of assigning tasks as employed by the random function.

* * * * *